US012536019B2

(12) United States Patent
Savir et al.

(10) Patent No.: US 12,536,019 B2
(45) Date of Patent: Jan. 27, 2026

(54) FPGA WIDE BARREL-SHIFTERS IMPLEMENTATION USING PACKED DSP MULTIPLIERS

(71) Applicant: Microsoft Technology Licensing, LLC, Redmond, WA (US)

(72) Inventors: Gil Savir, Haifa (IL); Tushar Garg, Seattle, WA (US); Maya Nurick, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 60 days.

(21) Appl. No.: 18/335,127

(22) Filed: Jun. 14, 2023

(65) Prior Publication Data

US 2024/0419446 A1  Dec. 19, 2024

(51) Int. Cl.
*G06F 9/30* (2018.01)
(52) U.S. Cl.
CPC ........ *G06F 9/30032* (2013.01); *G06F 9/3001* (2013.01); *G06F 9/30145* (2013.01)
(58) Field of Classification Search
CPC .................................................. G06F 9/30032
See application file for complete search history.

(56) References Cited

U.S. PATENT DOCUMENTS 6,549,926 B1 * 4/2003 Kalambur ............. G06F 7/5375
708/650
7,343,388 B1   3/2008 Burney et al.
11,095,760 B1 * 8/2021 Coole .................... H04L 69/22
2002/0167427 A1 * 11/2002 Furuta ............. H04N 21/23892
341/67
2020/0349420 A1 * 11/2020 Ovsiannikov .......... G06N 3/045

OTHER PUBLICATIONS

"Intel® Hyperflex™ Architecture High-Performance Design Hand", Retrieved from: https://www.google.com/url?sa=t&rct=j&q=&esrc=s&source=web&cd=&ved=2ahUKEwjm58Pb6o_AhWG3jgGHTesDAMQFnoECAgQAQ&url=https%3A%2F%2Fcdrdv2-public.intel.com%2F667078%2Fs10_hp_hb-683353-667078.pdf&usg=AOvVaw1g_uDyWCrNjwZ7zUCub_FH, Retrieved Date: May 5, 2023, 147 Pages.

(Continued)

*Primary Examiner* — Michael J Metzger
(74) *Attorney, Agent, or Firm* — Barta Jones, PLLC

(57) ABSTRACT

Barrel-shifters may be implemented in field programmable gate array (FPGA) using digital signal processor (DSP) multipliers, rather than consuming lookup table (LUT) resources. This advantageously uses otherwise under-utilized assets, leaving previously heavily-burdened LUT resources available for other uses. Building blocks of 8-bit and 4-bit DSP-based shifters are implemented in parallel sets for wide data and in tandem stages for larger shifts. For example, a 32-bit barrel-shifter may be implemented using a set of seven (7) parallel 8-bit shifters to handle the width of the data in a first stage and another set of eight (8) parallel 4-bit shifters in a second stage that operates in tandem with the first stage, to complete the shift. In an example, the first stage provides fine shifting and the second stage provides coarse shifting. To achieve even wider barrel-shifters, for example a 256-bit shifter, 32-bit barrel-shifter may be used recursively.

22 Claims, 14 Drawing Sheets

(56) References Cited

OTHER PUBLICATIONS

"Intel® Quartus® Prime Pro and Standard Software User Guides", Retrieved from: https://www.intel.com/content/www/us/en/support/programmable/support-resources/design-software/user-guides.html, Retrieved Date: May 5, 2023, 8 Pages.
Fu, et al., "Deep Learning with INT8 Optimization on Xilinx Devices", Retrieved from: https://docs.xilinx.com/v/u/en-US/wp486-deep-learning-int8, Apr. 24, 2017, 11 Pages.
Gigliotti, Paul, "Implementing Barrel Shifters Using Multipliers", Retrieved from: https://docs.xilinx.com/v/u/en-US/xapp195, Aug. 17, 2004, 4 Pages.
Falchieri, et al., "On-line data reduction on the ALICE SDD data concentrator card CARLOSrx", IEEE Nuclear Science Symposium Conference Record, 2009, pp. 605-608.
International Search Report and Written Opinion received for PCT Application No. PCT/US2024/032460, mailed on Oct. 15, 2024, 13 pages.
Sommer, et al., "HDSP-Packing: Squeezing Low-precision Arithmetic into FPGA DSP Blocks", 32nd International Conference on Field-Programmable Logic and Applications (FPL), 2022, pp. 160-166.

* cited by examiner

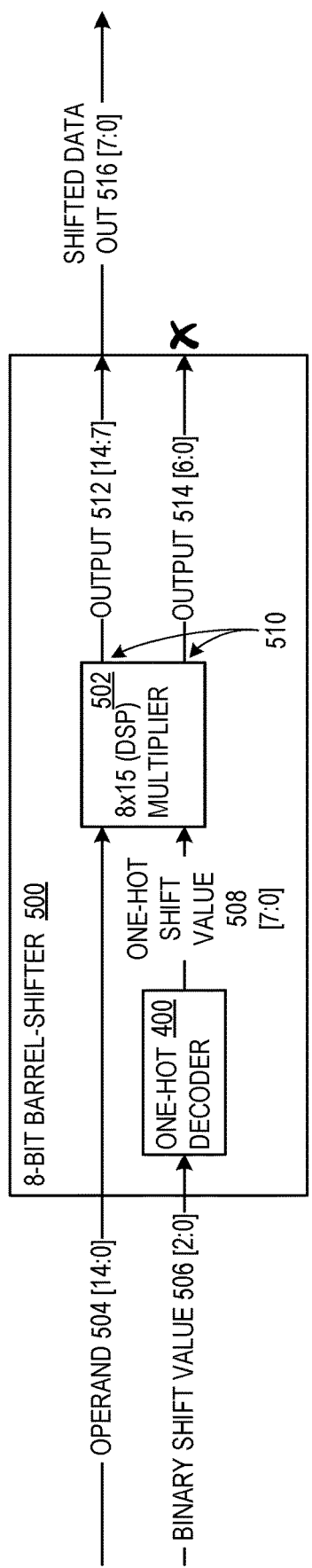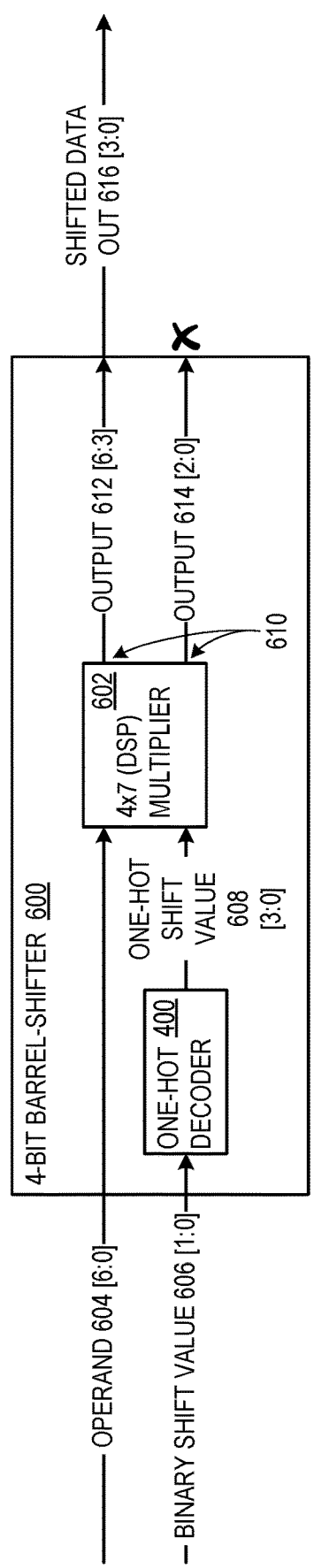

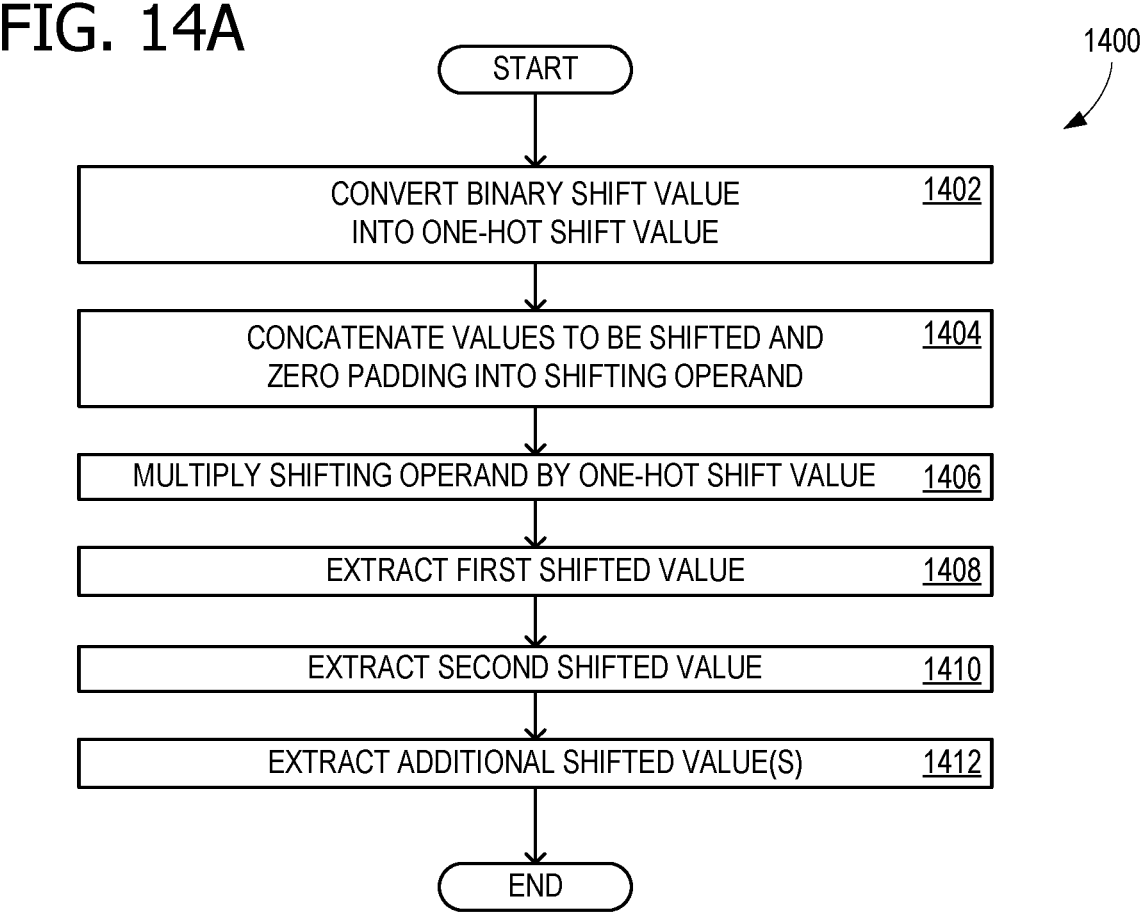

FPGA WIDE BARREL-SHIFTERS IMPLEMENTATION USING PACKED DSP MULTIPLIERS

BACKGROUND

A barrel-shifter is a combinational logic used for shifting a string of bits a certain number of steps in a certain direction. Barrel-shifters are often used as part of bus-aligner logic that receives unaligned strings of data as input and outputs contiguous fixed width strings of data. Bus-aligners are used in networking, and commonly implemented in field programmable gate arrays (FPGAs). Typically, barrel-shifters are implemented as a network of 2-to-1 multiplexers that are eventually mapped onto FPGA lookup table (LUT) resources. A common bus-aligner implementation may consume thousands of LUTs, which is a considerable use of resources.

SUMMARY

The disclosed examples are described in detail below with reference to the accompanying drawing figures listed below. The following summary is provided to illustrate some examples disclosed herein.

Example solutions for implementing wide barrel-shifters include: a first shift stage comprising: a first one-hot decoder operable to convert a first binary shift value into a first one-hot shift value; and a first L-by-M (L×M) multiplier operable to multiply a first portion of an operand by the first one-hot shift value, wherein the first portion of the operand comprises at least a portion of M least significant bits of the operand; and a second shift stage comprising: a second one-hot decoder operable to convert a second binary shift value into a second one-hot shift value, wherein the first binary shift value comprises least significant bits of a total binary shift value and wherein the second binary shift value comprises more significant bits of the total binary shift value than bits of the first binary shift value; and a first N-by-P (N×P) multiplier operable to multiply at least a portion of P most significant bits of an output of the first L×M multiplier by the second one-hot shift value.

Additional example solutions include: a barrel-shifting process comprising: converting a first binary shift value into a first one-hot shift value; multiplying, using a first L×M multiplier, a first portion of an operand by the first one-hot shift value, wherein the first portion of the operand comprises at least a portion of M least significant bits of the operand; and converting a second binary shift value into a second one-hot shift value, wherein the first binary shift value comprises least significant bits of a total binary shift value and wherein the second binary shift value comprises more significant bits of the total binary shift value than bits of the first binary shift value; and multiplying, using a first N×P multiplier, at least a portion of P most significant bits of an output of the first L×M multiplier by the second one-hot shift value.

Additional example solutions include: converting a binary shift value into a one-hot shift value; concatenating a first value to be shifted, a zero padding sequence, and a second value to be shifted into a shifting operand, with the first value to be shifted as least significant bits of the shifting operand and the second value to be shifted as more significant bits of the shifting operand: multiplying, using a digital signal processor (DSP) multiplier, the shifting operand by the one-hot shift value to produce a multiplication result: extracting a first subset of bits from a set of least significant bits of the multiplication result as a shifted value of the first value to be shifted; and extracting a second subset of bits from a set of more significant bits of the multiplication result as a shifted value of the second value to be shifted.

BRIEF DESCRIPTION OF THE DRAWINGS

The disclosed examples are described in detail below with reference to the accompanying drawing figures listed below:

FIG. 5 illustrates an example 8-bit DSP barrel-shifter, as may be used in examples of the architecture of FIG. 1;

FIG. 6 illustrates an example 4-bit DSP barrel-shifter, as may be used in examples of the architecture of FIG. 1;

FIGS. 12, 13, 14A, 14B, and 15 show flowcharts illustrating exemplary operations that may be performed by examples of the architecture of FIG. 1.

Corresponding reference characters indicate corresponding parts throughout the drawings.

DETAILED DESCRIPTION

Figure 1:
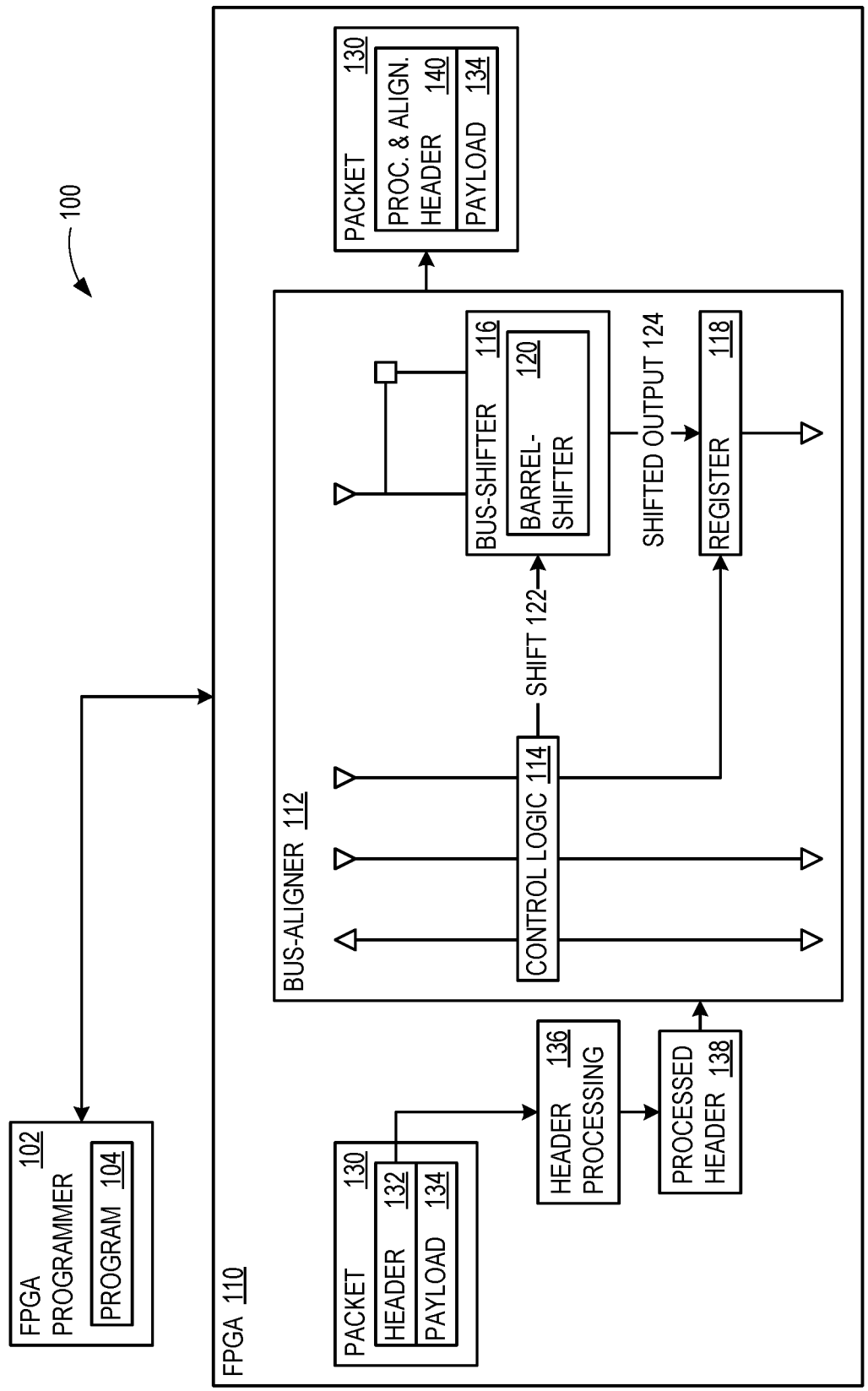
FIG. 1 illustrates an example architecture that advantageously implements field programmable gate array (FPGA) wide barrel-shifters using packed digital signal processor (DSP) multipliers.

Field programmable gate arrays (FPGAs) typically contain thousands of digital signal processor (DSP) modules, which are often under-utilized in networking applications, even as FPGA lookup table (LUT) resources are heavily used in current networking applications. Therefore, aspects of the disclosure free up LUT resources by implementing barrel-shifters using otherwise under-utilized DSP multipliers.

Barrel-shifters are used in header-aligner logic for dynamically (at run time), selecting a field from a packet header, and either removing it without leaving a bubble (hole), or adding a new field before it. Barrel-shifters are also used for parsing packet headers, where shifting of various header layers is required. Another common use for barrel-shifters is aligning packet headers with packet payloads when reattached, as is done after the headers are passed through the packet processing logic.

In disclosed examples, building blocks of 8-bit and 4-bit DSP-based shifters are implemented in parallel sets for wide data and in tandem stages for larger shifts. For example, a 32-bit barrel shifter may be implemented using a set of seven (7) parallel 8-bit shifters to handle the width of the data in a first stage and another set of eight (8) parallel 4-bit shifters in a second stage that operates in tandem with the first stage, to complete the shift. In an example, the first stage provides fine shifting and the second stage provides coarse shifting. To achieve even wider barrel-shifters, for example a 256-bit barrel-shifter, a 32-bit barrel-shifter may be used recursively.

In general, given a shifting value that is S bits wide (in binary representation, prior to one-hot decoding), a barrel-shifter has a (to be shifted) input operand that is $(2 \times 2^S)-1$ bits wide, and an output that is $2^S$ bits wide. When input into a multiplier, in the examples described herein, the shifting operand is expanded by one-hot decoding. However, DSP multipliers on FPGAs are typically implemented in sizes of N×N or (N+1)×N, so zero padding of the (more significant) unused input bits is required. Additionally, in some examples, the fine and coarse shifting stages may be swapped, such that the first stage provides fine shifting and the second stage provides coarse shifting. However, this configuration may result in a slightly higher count of multipliers required for the same amount of shift.

Aspects of the disclosure improve the efficiency of computing hardware (e.g., FPGAs) by freeing up heavily-burdened LUT resources in exchange for using otherwise under-utilized DSP resources. This enables either lowering logic density or packing a larger number of functions into an FPGA. Lowering logic density provides the benefit of enabling greater optimization of FPGA mapping and routing. Packing a larger number of functions into an FPGA provides the benefits of reducing the number of FPGAs need for a given set of requirements and/or enabling a given count of FPGAs to perform a larger number of tasks.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously implements FPGA wide barrel-shifters using packed DSP multipliers. An FPGA programmer 102 programs an FPGA 110 with an FPGA program 104 that may implement a networking function (among other functions), such as a bus aligner 112. That is, after programming, the logic of FPGA program 104 is implemented in the hardware circuitry of FPGA 110.

Bus aligner 112 has control logic 114, a bus-shifter 116, and a latchable register 118. Control-logic 114 determines a shift that is needed for data in each clock-cycle, when to pull the data to be processed, which data words latchable register 118 should latch, and when the latched data is valid. The needed shift is shown as total binary shift value 122. It is common for input and output buses to be word-aligned. If the alignment word length is W bits, the shift resolution needs to be in steps of W bits. Output 124 of bus-shifter 116 is stored in latchable register 118 until it is delivered to a bus and replaced by the next shifted data.

A practical use of barrel-shifter 120 of a networking application is also shown in FIG. 1. A packet 130, such as a data packet passing through a computer network, comprises a packet header 132 and a packet payload 134. Packet header 132 is separated from packet payload 134 and sent to a packet header processor 136 that processes packet header 132 (e.g., adds, deletes, or changes a packet header field) to produce a processed packet header 138. Processed packet header 138 may need to be aligned to remove one or more bubbles (or holes) resulting from the processing, and so is passed to bus aligner 112, which uses barrel shifter 120 to align processed packet header 138 by performing barrel-shifting. This produces aligned, processed packet header 140, which is attached to packet payload 134 to reconstitute packet 130. Packet 130 may then be forwarded on its journey across the computer network.

Figure 2:
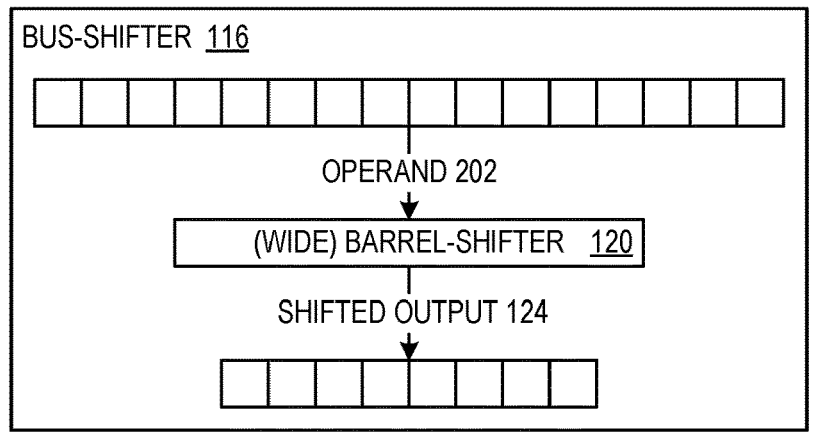
FIG. 2 illustrates further detail for aspects of the example architecture of FIG. 1.
Figure 7:
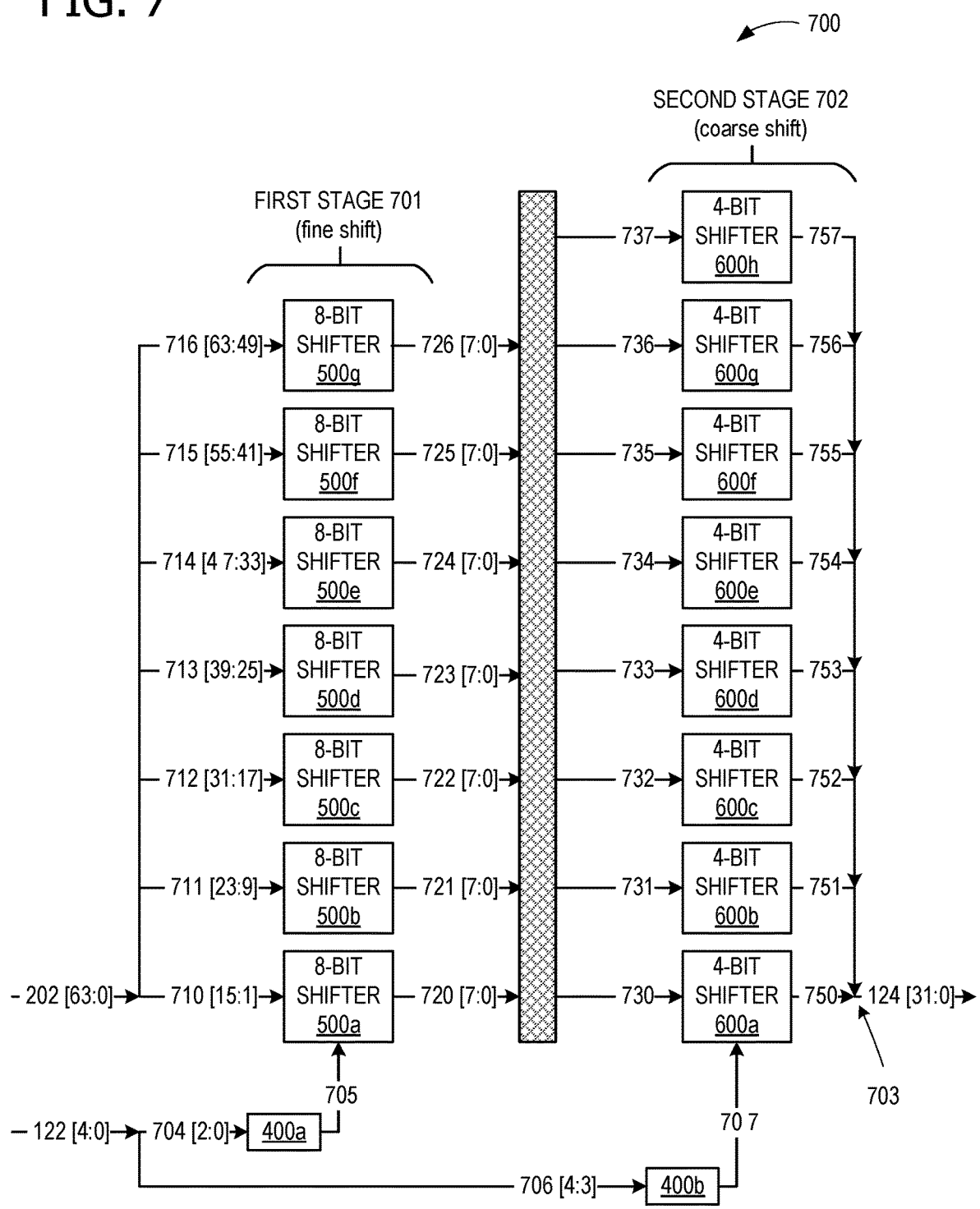
FIG. 7 illustrates an example 32-bit DSP barrel-shifter, as may be used in examples of the architecture of FIG. 1.
Figure 8:
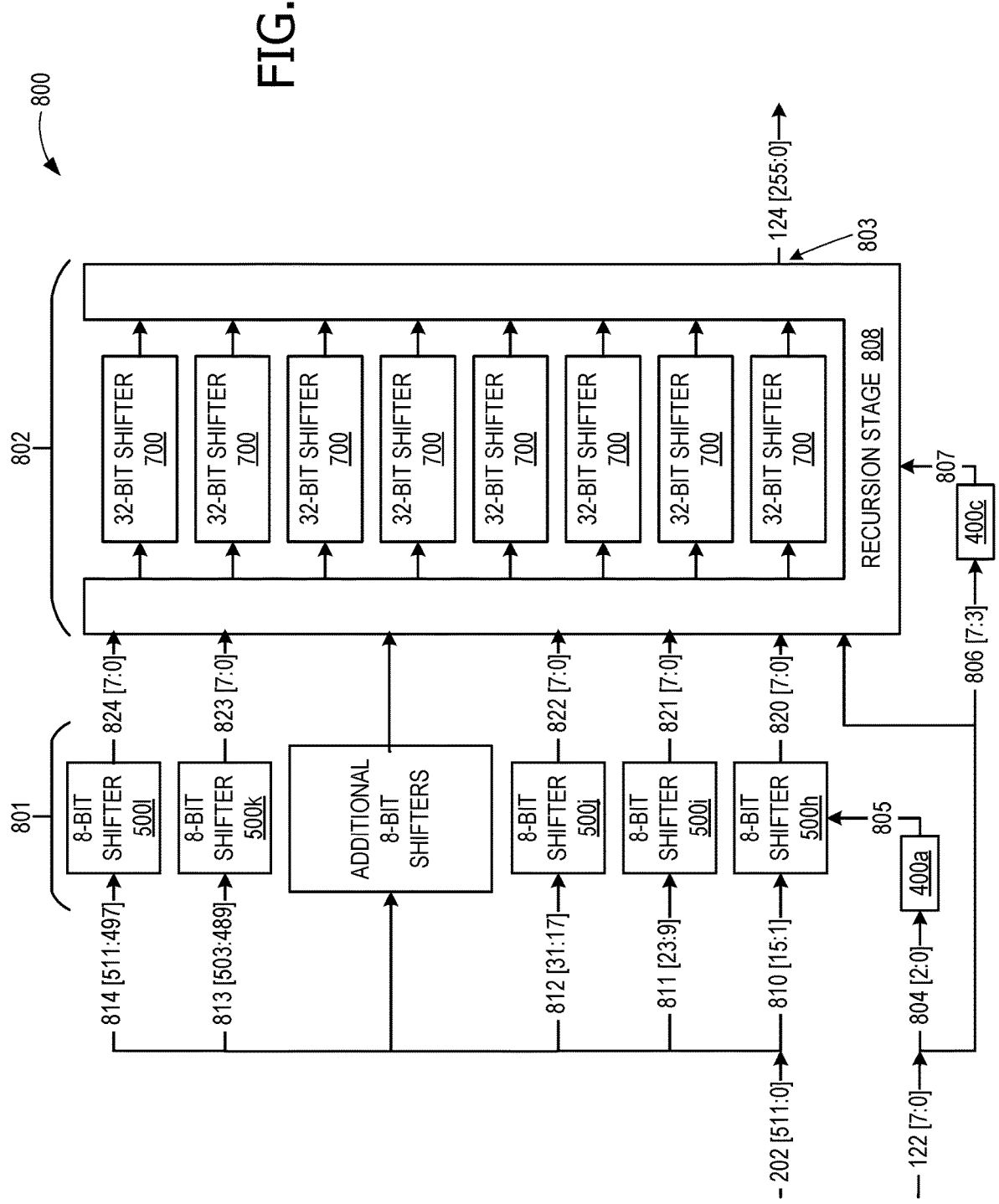
FIG. 8 illustrates an example 256-bit DSP barrel-shifter, as may be used in examples of the architecture of FIG. 1.
Figure 11:
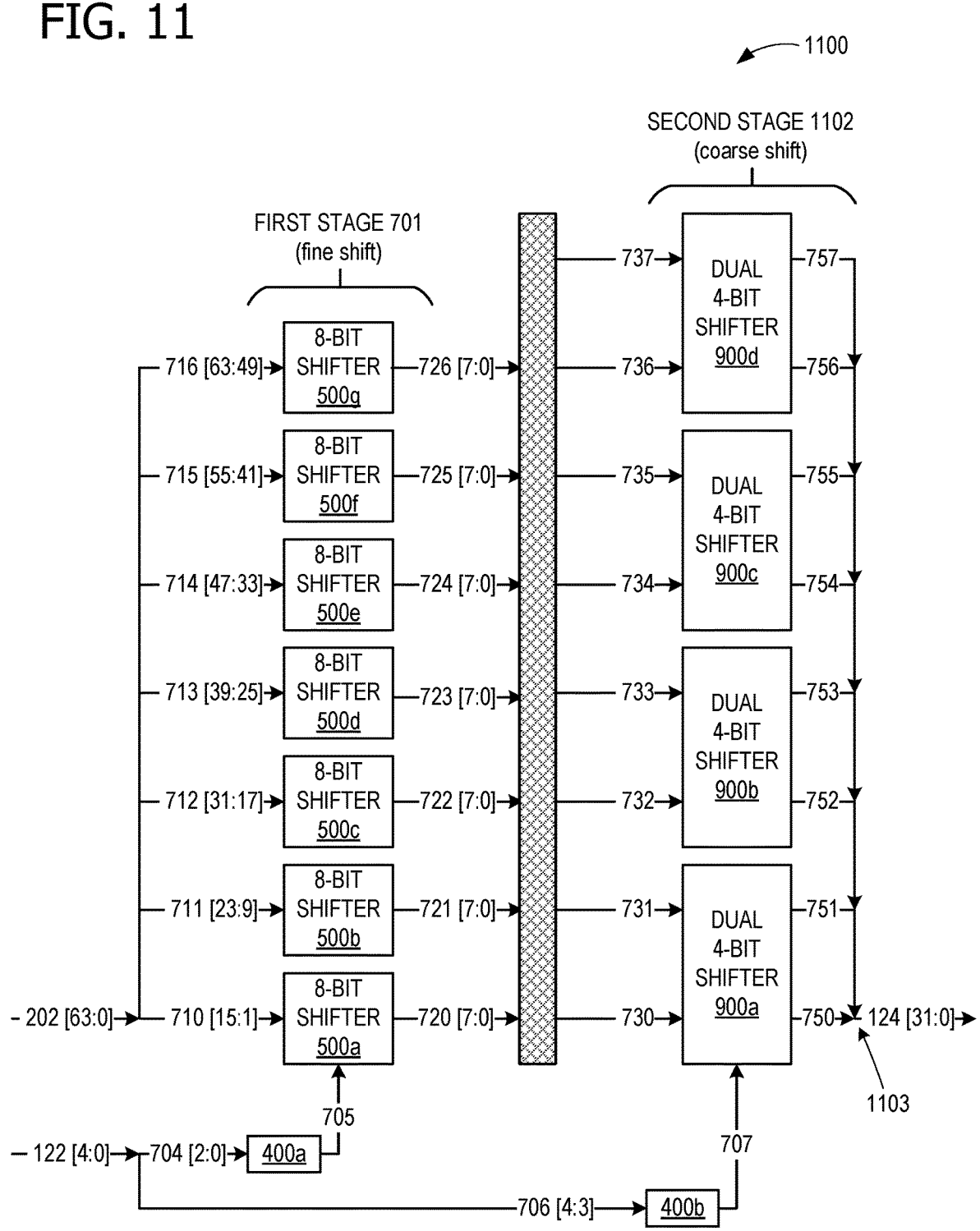
FIG. 11 illustrates an alternative example 32-bit DSP barrel-shifter, as may be used in examples of the architecture of FIG. 1.

FIG. 2 illustrates further detail for bus-shifter 116. An operand 202 is provided to a barrel-shifter 120, which produces shifted output 124 of barrel-shifter 120. In the illustrated example, operand 202 is 16 bits wide and output 124 is 8 bits wide, although other data widths are used in other examples. Examples of barrel-shifter 120 are shown in FIGS. 7, 8, and 11. Barrel-shifter 120 is a wide barrel-shifter because it is able to provide barrel-shifting for wide words, such as 32-bit (FIGS. 7 and 11), 64-bit, 128-bit, 256-bit (FIG. 8), and even wider words (generally limited only by the number of multipliers on the FPGA). Examples of barrel-shifter 120 are built using components, such as multiple ones of an 8-bit shifter 500 of FIG. 5 and/or a 4-bit shifter 600 of FIG. 6.

Figure 3:
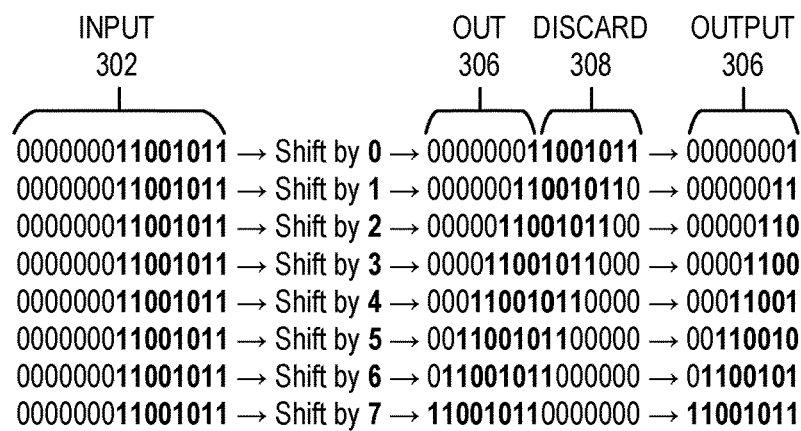
FIG. 3 illustrates exemplary barrel-shifting, as may occur in examples of the architecture of FIG. 1.

FIG. 3 illustrates barrel shifting of up to seven (7) bits of an input 302. An output bit sequence has the most significant bits used as barrel-shifting output 306, followed by discarded bits 308. The examples show input 302 as 15 bits wide, with a value of 000000011001011. The output bit sequence is 15 bits wide, with barrel-shifting output 306 being 8 bits wide and discarded bits 308 being 7 bits wide. FIG. 3 shows barrel-shifting results for 0 through 7 bits, although other bit widths are also used in various examples of the disclosure. When an 8×16 multiplier is used (rather than an 8×15 multiplier), the unused 16th bit (most significant bit) may be zero padded.

Figure 4:
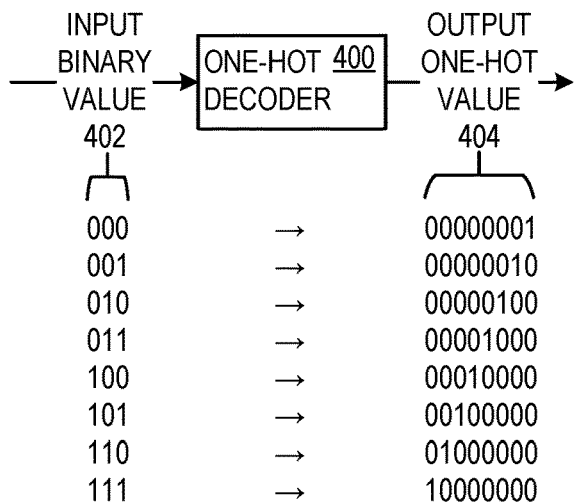
FIG. 4 illustrates exemplary one-hot decoding, as may occur in examples of the architecture of FIG. 1.

FIG. 4 illustrates one-hot decoding. A one-hot value is a group of bits among which only a single bit may be a 1 and the others must all be 0. A one-hot decoder 400 has an input that is S bits wide and an output that is $2^S$ bits wide. In the illustrated example, S=3, so the output is 8 bits wide. One-hot decoder 400 takes the binary value of an input binary value 402 and produces an output one-hot value 404 in which the 1-valued bit is the bit in position $2^{(shift\ value)}$ as counted from the right.

For example, a binary shift value of 000 gives a result of $2^0$=00000001, which is the number 1 in both binary and decimal. Multiplication by 1 gives no shift. A binary shift value of 001 gives a result of $2^1$=00000010 in binary, which is 2 in decimal. Multiplication by 2 gives a left shift by 1 place. A binary shift value of 111 gives a result of $2^7$=10000000 in binary, which is 128 in decimal. Multiplication by 128 gives a left shift by 7 places. FIG. 3 shows the values for binary values from 000 through 111, although other bit widths are also used in various examples of the disclosure. Some examples do use LUT resources for one-hot decoding, although this is a significantly lower burden than using LUT resources for barrel-shifting.

FIG. 5 illustrates an example 8-bit shifter 500 that uses an 8-by-15 (8×15) multiplier 502, but does not require LUT resources (apart from the relatively few LUT resources used by one-hot decoder 400). Due to the nature of binary representation, multiplication of any number by a one-hot value results in a bit-shift of that number. That is, any binary number B multiplied by $2^Y$ is effectively left-shifted by Y positions. This is leveraged to replace the traditional multiplexer and LUT implementation of barrel-shifters with one-hot decoders and multipliers.

For an L-bit shift, a (2L−1) bit wide operand is used in an L-by-M (L×M) multiplier, where M is 2L−1 (two times L, minus 1). The padding provides room for the input value to move into the padded portion of the operand. The initial output of the multiplier is truncated to remove the L−1 least significant bits, and the next L more significant bits are retained as the barrel-shifted output.

In the example of FIG. 5, 8×15 multiplier 502 may be generically referred to as an L×M multiplier, in which L is 8 and M is 15. An operand 504 is then (2×8−1)=15 bits wide, which is indicated using the convention [14:0] that means bits from the 15th position from the right to the right-most bit. Zero (0) is the right-most bit, and the 14th bit in zero-based indexing is the 15th bit from the right. A binary shift value 506 can take on values from 0 to 7. This is indicated by the convention [2:0], which allows for 3 bits (with zero-based indexing). In some examples, an 8×16 multiplier may be used as multiplier 502, in which the 16th bit (most significant bit) is unused.

One-hot decoder 400 receives binary shift value 506 and outputs a one-hot shift value 508, which is 8 bits wide (based on the convention [7:0]). 8×15 multiplier 502 multiplies operand 504 by one-hot shift value 508 to produce an initial output 510 that is 16 bits wide. The left-most bit is unused/ignored. Of what is left, the 8 most significant bits ([14:7]) are retained as an output 512 and another output 514, which are the 7 least significant bits ([6:0]), is discarded. Output 512 (a portion of output 510) is recast as a shifted data output 516 of 8-bit shifter 500. Output 516 is 8 bits wide ([7:0]).

FIG. 6 is similar to FIG. 5, but illustrates an example 4-bit shifter 600 that uses a 4-by-7 (4×7) multiplier 602. In the example of FIG. 5, 4×7 multiplier 602 may be generically referred to as an N-by-P (N×P) multiplier, in which N is 4 and P is 7. P is 2×4−1=7. In some examples, a 2×8 multiplier may be used, with the most significant 8th bit unused. An operand 604 is (2×4−1)=7 bits wide, which is indicated using the convention [6:0]. A binary shift value 606 can take on values from 0 to 3. This is indicated by the convention [1:0], which allows for 2 bits. One-hot decoder 400 receives binary shift value 606 and outputs a one-hot shift value 608, which is 4 bits wide ([3:0]). 4×7 multiplier 602 multiplies operand 604 by one-hot shift value 608 to produce an initial output 610 that is 7 bits wide. The 4 most significant bits ([6:3]) are retained as an output 612 and another output 614, which are the 3 least significant bits ([2:0]), is discarded. Output 612 (a portion of output 610) is recast as a shifted data output 616 of 4-bit shifter 600. Output 616 is 4 bits wide ([3:0]).

FIG. 7 illustrates an example 32-bit barrel-shifter 700 that may be one example of barrel-shifter 120 shown in FIGS. 1 and 2. 32-bit barrel-shifter 700 is implemented using two stages, a first shift stage 701 and a second shift stage 702. In this example, operand 202 is 64 bits ([63:0]) and is segmented into 7 overlapping portions that are each 15 bits wide and overlap by 7 bits. In this architecture, in general, for portions of width M, the overlap is M/2 bits. A portion 710 is from the least significant bits [15:1] and a portion 711 is from more significant bits [23:9], with the overlap being [15:9]. The remaining portions, going upward in bit significance, are portion 712, portion 713, portion 714, portion 715, and portion 716 having the most significant bits [63:49].

In this example, total binary shift value 122 is 5 bits wide ([4:0]), allowing for up to 31 bits of shifting. Total binary shift value 122 is segmented into two portions, a binary shift value 704 that is 3 bits wide ([2:0]) and a binary shift value 706 that is 2 bits wide ([4:3]). Binary shift value 704 is the least significant bits of total binary shift value 122 and so provides fine shifting, whereas binary shift value 706 is the most significant bits of total binary shift value 122 and so provides coarse shifting. A one-hot decoder 400a converts binary shift value 706 into a one-hot shift value 705 that is 7 or 8 bits wide, and a one-hot decoder 400b converts binary shift value 706 into a one-hot shift value 707 that is 3 or 4 bits wide.

A set of seven 8-bit shifters 500 (designated as 8-bit shifters 500a-500g) multiplies the various portions of operand 202 by one-hot shift value 705. As illustrated, 8-bit shifter 500a multiplies portion 710 of operand 202 by one-hot shift value 705 to produce an output 720; 8-bit shifter 500b multiplies portion 711 of operand 202 by one-hot shift value 705 to produce an output 721; 8-bit shifter 500c multiplies portion 712 of operand 202 by one-hot shift value 705 to produce an output 722; 8-bit shifter 500d multiplies portion 713 of operand 202 by one-hot shift value 705 to produce an output 723; 8-bit shifter 500e multiplies portion 714 of operand 202 by one-hot shift value 705 to produce an output 724; 8-bit shifter 500f multiplies portion 715 of operand 202 by one-hot shift value 705 to produce an output 725; and 8-bit shifter 500g multiplies portion 716 of operand 202 by one-hot shift value 705 to produce an output 726.

Together, 8-bit shifters 500a-500h and one-hot decoder 400a provide fine shifting capability of first shift stage 701. A set of eight 4-bit shifters 600a-600g and one-hot decoder 400b provide coarse shifting capability of second shift stage 702. In general, for an N-bit shift, the sizes of the multipliers are such that L>=N, P>=2×N−1, and M>=2×N−1.

The least significant bit of each of outputs 720-726 are provided as an input 730 to 4-bit shifter 600a, which multiplies input 730 by one-hot shift value 707 to produce an output 750. The least significant bit of output 720 is the least significant bit of input 730. The least significant bit of output 721 is the next least significant bit of input 730, the least significant bit of output 722 is the next least significant bit of input 730, and so on, until the least significant bit of output 726 is the most significant bit of input 730.

This scheme of the significance of the bits of other inputs 731-737 corresponding to the relative positions of outputs 720-726 continues for forming other inputs 731-737. For example, the second least significant bit of output 720 is the least significant bit of input 731, the second least significant bit of output 721 is the next least significant bit of input 731, the second least significant bit of output 722 is the next least significant bit of input 731, and so on, until the second least significant bit of output 726 is the most significant bit of input 731. The most significant bit of output 720 is the least significant bit of input 737, the most significant bit of output 721 is the next least significant bit of input 737, the most significant bit of output 722 is the next least significant bit of input 737, and so on, until the most significant bit of output 726 is the most significant bit of input 737.

The second least significant bit of each of outputs 720-726 are provided as an input 731 to 4-bit shifter 600b, which multiplies input 731 by one-hot shift value 707 to produce an output 751. The third least significant bit of each of outputs 720-726 are provided as an input 732 to 4-bit shifter 600c, which multiplies input 732 by one-hot shift value 707 to produce an output 752. The fourth least significant bit of each of outputs 720-726 are provided as an input 733 to 4-bit shifter 600d, which multiplies input 733 by one-hot shift value 707 to produce an output 753. The fifth least significant bit of each of outputs 720-726 are provided as an input 734 to 4-bit shifter 600e, which multiplies input 734 by one-hot shift value 707 to produce an output 754. The sixth least significant bit of each of outputs 720-726 are provided as an input 735 to 4-bit shifter 600*f*, which multiplies input 735 by one-hot shift value 707 to produce an output 755. The seventh least significant bit of each of outputs 720-726 are provided as an input 736 to 4-bit shifter 600*g*, which multiplies input 736 by one-hot shift value 707 to produce an output 756. The most (eighth least significant) bit of each of outputs 720-726 are provided as an input 737 to 4-bit shifter 600*h*, which multiplies input 737 by one-hot shift value 707 to produce an output 757.

Outputs 750-757 are concatenated into an output 703 of second shift stage 702. Output 750 is the least significant bits of output 703, output 751 is more significant bits (than output 750), and output 756 is the most significant bits of output 703. Since there are only two stages in this example (some examples may have more stages) output 703 becomes output 124 of 32-bit barrel-shifter 700 (which is an example of barrel-shifter 120).

FIG. 8 illustrates an example 256-bit barrel-shifter 800 that may be one example of barrel-shifter 120 shown in FIGS. 1 and 2. 256-bit barrel-shifter 800 is implemented using a first shift stage 801 and a second shift stage 802, although since second stage 802 is implemented using 32-bit barrel-shifter 700, which itself has two stages, 256-bit barrel-shifter 800 may be considered to have three stages. In this example, operand 202 is 512 bits ([511:0]) and is segmented into 63 overlapping portions that are each 15 bits wide and overlap by 7 bits. A portion 810 is from the least significant bits [15:1] and a portion 811 is from more significant bits [23:9], with the overlap being [15:9]. The remaining portions that are shown, going upward in bit significance, are portion 812, portion 813, and portion 814 having the most significant bits [511:497]. For clarity, the intervening portions between portions 812 and 813 are not shown.

In this example, total binary shift value 122 is 8 bits wide ([7:0]), allowing for up to 255 bits of shifting. Total binary shift value 122 is segmented into two portions, a binary shift value 804 that is 3 bits wide ([2:0]) and a binary shift value 806 that is 5 bits wide ([7:3]). Binary shift value 804 is the least significant bits of total binary shift value 122 and so provides fine shifting, whereas binary shift value 806 is the most significant bits of total binary shift value 122 and so provides coarse shifting. One-hot decoder 400*a* converts binary shift value 806 into a one-hot shift value 805 that is 7 or 8 bits wide, and a one-hot decoder 400*c* converts binary shift value 806 into a one-hot shift value 807 that is wide enough to provide for the remainder of the shift.

A set of 63 8-bit shifters 500 multiplies the various portions of operand 202 by one-hot shift value 805. Five of the 8-bit shifters 500, designated as 8-bit shifters 500*h*-500*l* (lower case L) are shown. As illustrated, 8-bit shifter 500*h* multiplies portion 810 of operand 202 by one-hot shift value 805 to produce an output 820; 8-bit shifter 500*i* multiplies portion 811 of operand 202 by one-hot shift value 805 to produce an output 821; 8-bit shifter 500*j* multiplies portion 812 of operand 202 by one-hot shift value 805 to produce an output 822; 8-bit shifter 500*k* multiplies portion 813 of operand 202 by one-hot shift value 805 to produce an output 823; and 8-bit shifter 500*l* multiplies portion 814 of operand 202 by one-hot shift value 805 to produce an output 824.

Together, 8-bit shifters 500*h*-500*l* (and the ones not shown) and one-hot decoder 400*a* provide fine shifting capability of first shift stage 801. A recursion stage 808, 32-bit barrel-shifter 700, and one-hot decoder 400*c* provide coarse shifting capability of second shift stage 802. Recursion stage 808 calls 32-bit barrel-shifter 700 multiple times in order to complete the remaining shift, indicated by binary shift value 806 divided by 32.

Calling 32-bit barrel-shifter 700 K times results in a K×32 (K times 32) shift. Recursion stage 808 handles any combining of bits needed of outputs 820-824 and concatenating outputs of 32-bit barrel-shifter 700 K from the various iterations into an output 803 of second shift stage 802. Since there are no further stages in this example (some examples may have more stages) output 803 becomes output 124 of 256-bit barrel-shifter 800 (which is an example of barrel-shifter 120).

Figure 9:
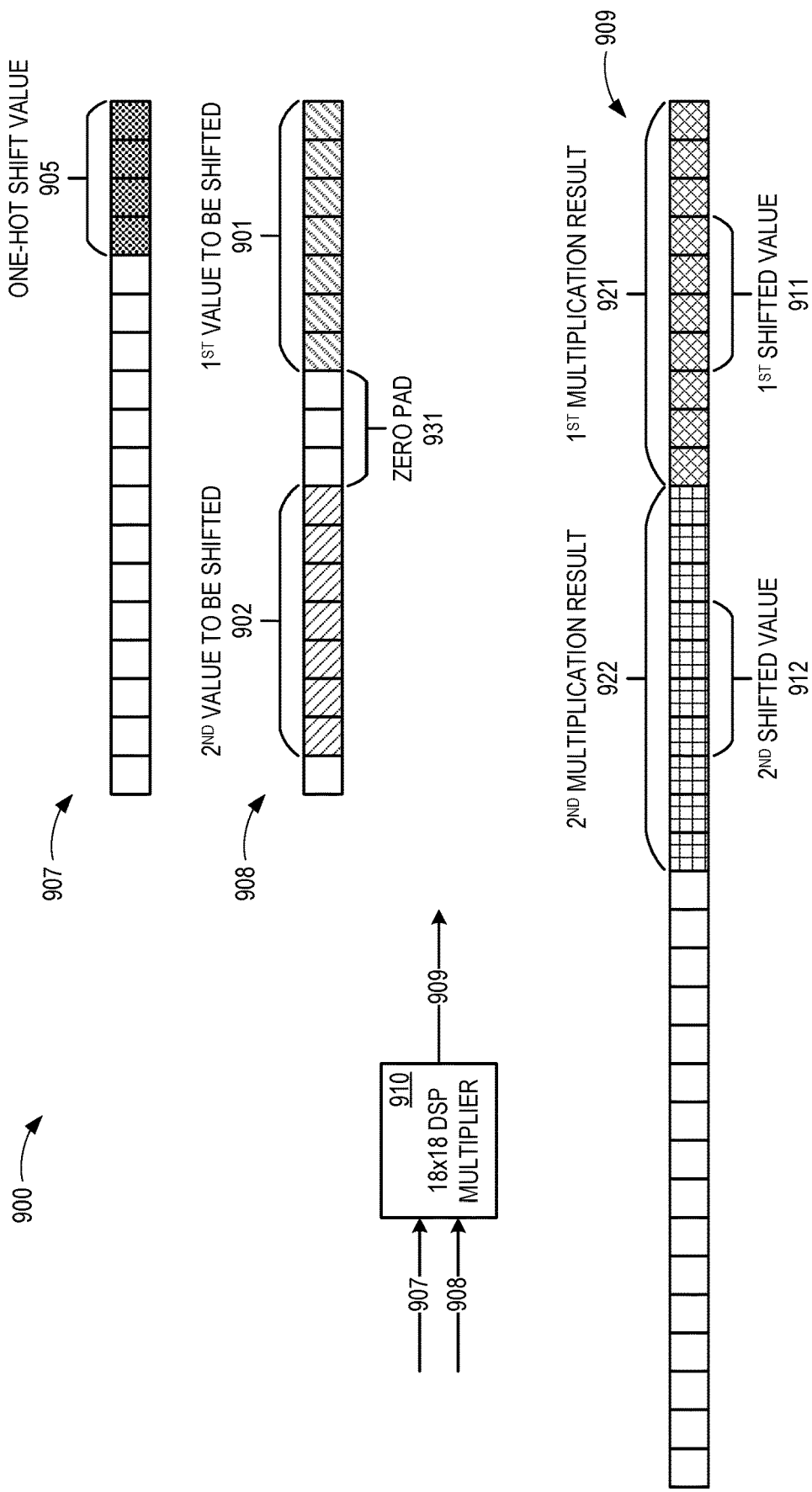
FIG. 9 illustrates an example PACKING scheme, as may be used in examples of the architecture of FIG. 1.

FIG. 9 illustrates an example packing scheme 900 that packs multiple narrow shifters into a single DSP multiplier. Packing scheme 900 packs two 4-bit shifters into a single DSP multiplier, since both shifters shift by the same amount and the operand has a sufficient number of bits to hold both shift values, separated by zero-padding such that the multiplication results do not overlap. The shifted values may then be extracted from various bit fields of the multiplication results. A first value 901 to be shifted and a second value 902 to be shifted are each 7 bits wide, and a one-hot shift value 905 is 4 bits wide.

One-hot shift value 905 is placed into the 4 least significant bits of an 18 bit wide operand 907. Value 901 is placed into the 7 least significant bits of an 18 bit wide shifting operand 908. The next 3 more significant bits of shifting operand 908 hold a 3 bit wide zero padding sequence 931, and the next 7 more significant bits of shifting operand 908 hold value 902.

Operand 907 and shifting operand 908 are multiplied by an 18-by-18 (18×18) multiplier 910, which outputs a multiplication result 909 that is 36 bits wide. A first subset of bits from a set of least significant bits 921 of multiplication result 909 is a shifted value 911 of value 901. A second subset of bits from a set of more significant bits 922 of multiplication result 909 is a shifted value 912 of value 902. This works because zero padding sequence 931 in shifting operand 908, between values 901 and 902 prevent set of least significant bits 921 from spilling over into set of more significant bits 922.

Figure 10:
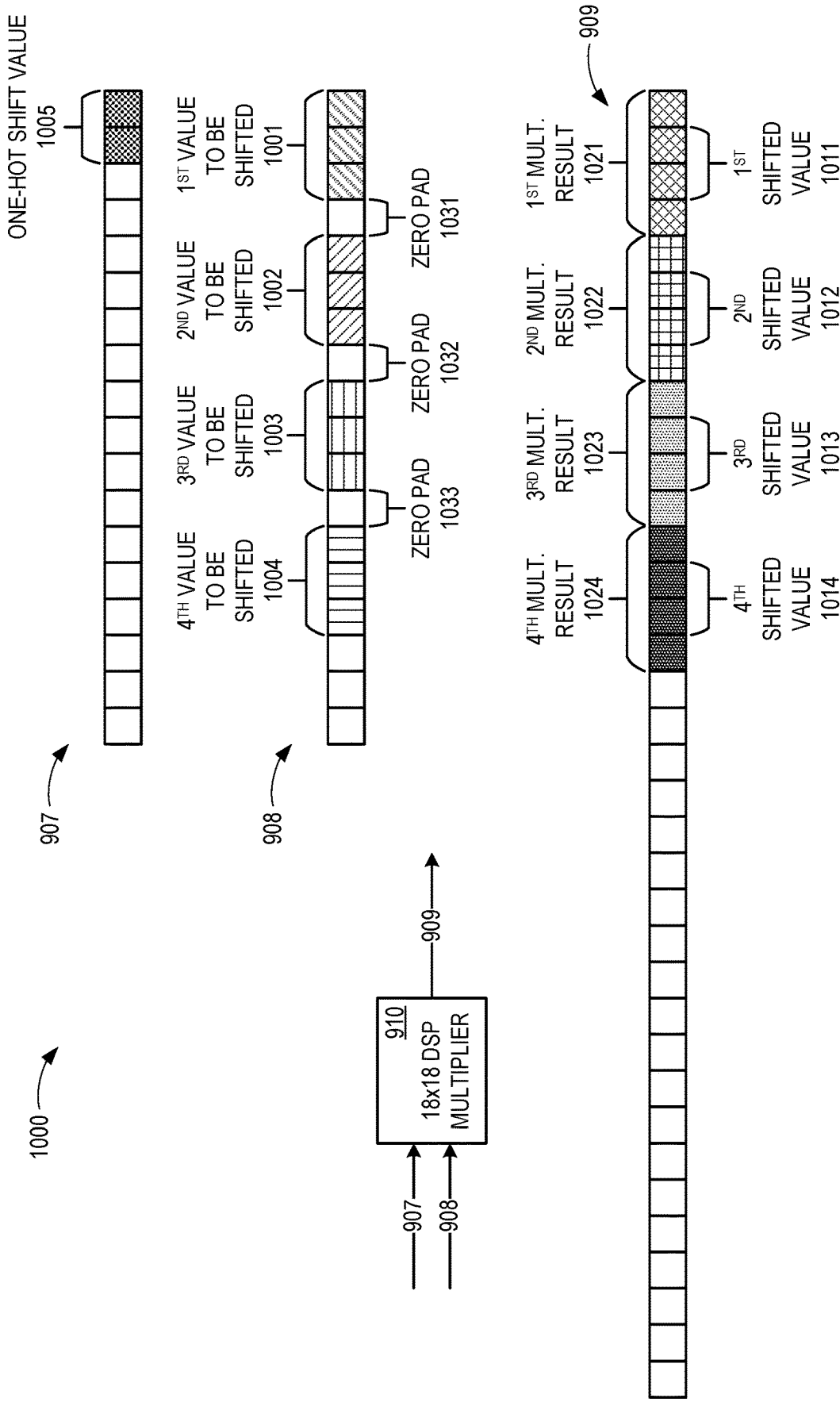
FIG. 10 illustrates an example PACKING scheme, as may be used in examples of the architecture of FIG. 1.

FIG. 10 illustrates an example packing scheme 1000 that packs four 2-bit shifters into a single DSP multiplier. A first value 1001 to be shifted, a second value 1002 to be shifted, a third value 1003 to be shifted, and a fourth value 1004 to be shifted are each 3 bits wide, and a one-hot shift value 1005 is 2 bits wide. One-hot shift value 1005 is placed into the 2 least significant bits of 18 bit wide operand 907. Value 1001 is placed into the 3 least significant bits of 18 bit wide shifting operand 908.

The next more significant bit of shifting operand 1008 holds a 1 bit wide zero padding sequence 1031, and the next 3 more significant bits of shifting operand 1008 hold value 1002. The next more significant bit of shifting operand 1008 holds a 1 bit wide zero padding sequence 1032, and the next 3 more significant bits of shifting operand 1008 hold value 1003. The next more significant bit of shifting operand 1008 holds a 1 bit wide zero padding sequence 1033, and the next 3 more significant bits of shifting operand 1008 hold value 1004.

Operand 907 and shifting operand 908 are multiplied by 18×18 multiplier 910, which outputs a multiplication result 909 that is 36 bits wide. A first subset of bits from a set of least significant bits 1021 of multiplication result 909 is a shifted value 1011 of value 1001. A second subset of bits from a set of more significant bits 1022 of multiplication result 909 is a shifted value 1012 of value 1002. A third subset of bits from a set of bits 1023 of multiplication result 909 is a shifted value 1013 of value 1003. A fourth subset of bits from a set of bits 1024 of multiplication result 909 is a shifted value 1014 of value 1004. Because values 1001-1004 are only 3 bits wide, and one-hot shift value 1005 is only 2 bits wide, zero padding sequences 1031-1032 need to be only a single bit wide in order to prevent intermingling of multiplication results of values 1001-1004 by one-hot shift value 1005.

FIG. 11 illustrates an alternative example 32-bit barrel-shifter 1100 that uses packing scheme 900 (of FIG. 9) with a version of 32-bit barrel-shifter 700 (of FIG. 7), and may also be one example of barrel-shifter 120 shown in FIGS. 1 and 2. Second shift stage 702 of 32-bit barrel-shifter 700 is replaced with second stage 1102 of 32-bit barrel-shifter 1100. Many aspects of 32-bit barrel-shifter 700 are repeated in 32-bit barrel-shifter 1100, with the primary difference being the replacement of the eight 4-bit shifters 600a-600g of 32-bit barrel-shifter 700 with a set of four dual 4-bit shifters 900a-900d. Dual 4-bit shifters 900a-900d each implements packing scheme 900.

Dual 4-bit shifter 900a takes the place of 4-bit shifters 600a and 600b; dual 4-bit shifter 900b takes the place of 4-bit shifters 600c and 600d; dual 4-bit shifter 900c takes the place of 4-bit shifters 600e and 600f; and dual 4-bit shifter 900d takes the place of 4-bit shifters 600g and 600h. The output of second stage 1102 is output 1103, which becomes output 124 of 32-bit barrel-shifter 1100 (which is an example of barrel-shifter 120).

Figure 12:
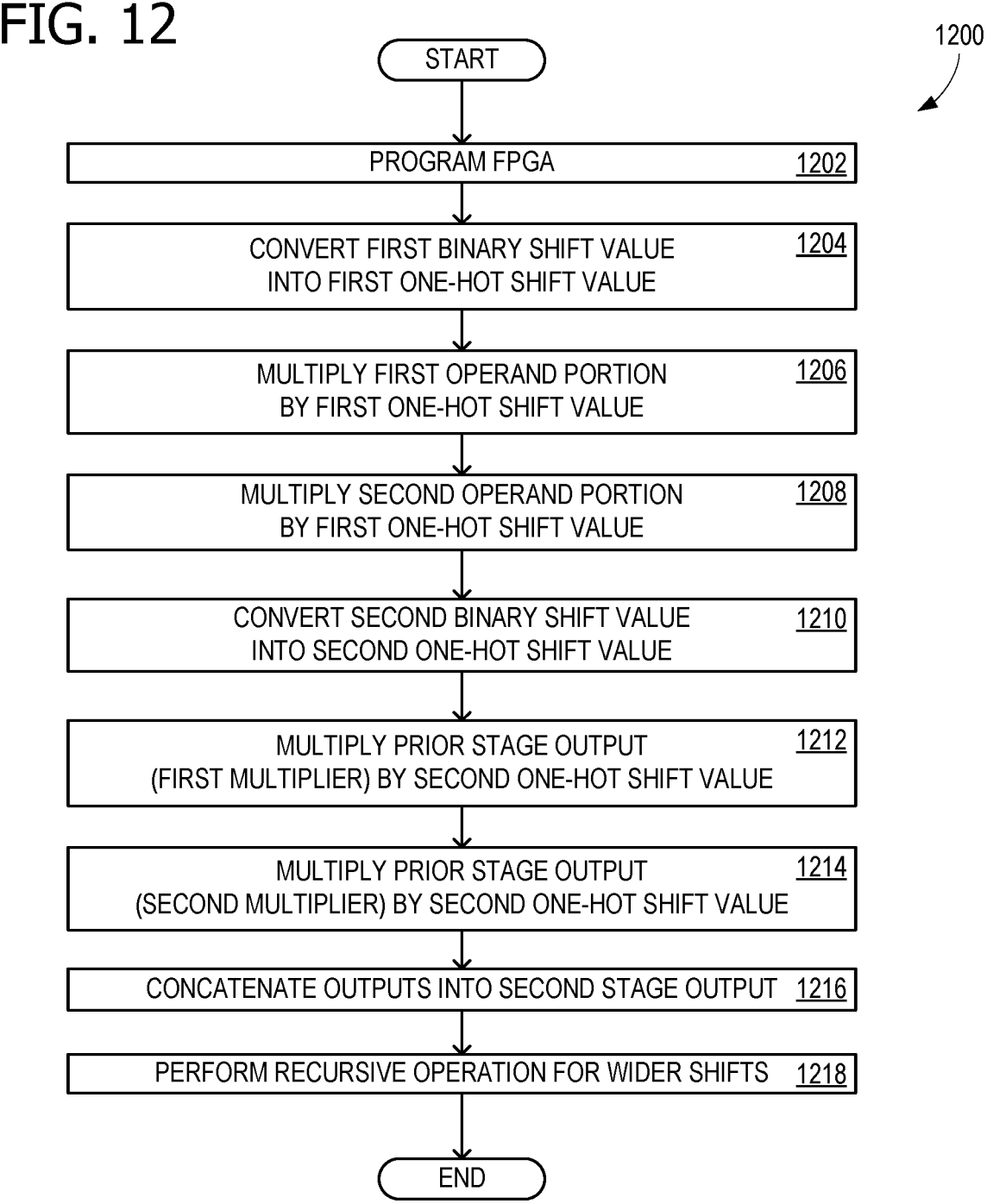

FIG. 12 shows a flowchart 1200 illustrating exemplary operations that may be performed by architecture 100. In some examples, operations described for flowchart 1200 are performed by computing device 1600 of FIG. 16. Flowchart 1200 is generally described using 32-bit barrel-shifter 700, although it should be understood that the other example bit-shifters may implement aspects of flowchart 1200 (see FIGS. 8 and 11). Flowchart 1200 commences with programming FPGA 110 to implement a barrel-shifting process in operation 1202.

In the barrel-shifting process, operation 1204 converts binary shift value 704 into one-hot shift value 705. Operation 1206 multiplies portion 710 of operand 202 by one-hot shift value 705 using 8×15 multiplier 502 (generally an L×M multiplier, which may be an L×(2L−1) multiplier) in 8-bit shifter 500a. Operation 1208 multiplies portion 711 of operand 202 by one-hot shift value 705 using 8×15 multiplier 502 in 8-bit shifter 500b. Other portions of operand 202 are also multiplied by one-hot shift value 705.

Operation 1210 converts binary shift value 706 into one-hot shift value 707. Operation 1212 multiplies at least a portion of the most significant bits of an output of 8×15 multiplier 502 in 8-bit shifter 500a by one-hot shift value 707 using 4×7 multiplier 602 (generally, an N×P multiplier) in 4-bit shifter 600a. Operation 1214 multiplies at least a portion of the most significant bits of an output of 8×15 multiplier 502 in 8-bit shifter 500b by one-hot shift value 707 using 4×7 multiplier 602 in 4-bit shifter 600b. Other outputs of first shift stage 701 are also multiplied by one-hot shift value 707.

Some examples perform multiple simultaneous independent multiplications using the DSP multipliers, as described in relation to 32-bit barrel-shifter 1100 implementing packing scheme 900 or 1000. That is, in some examples, operations 1206, 1208, 1212, and/or 1214 implement flowchart 1300 of FIG. 13, described below.

Operation 1216 concatenates outputs 750-757, such that output 750 comprises the least significant bits of the concatenation (which becomes output 703). In some wide shifting examples, operation 1218 recursively implements the barrel-shifting process of operations 1204-1216 K times to produce a shift of K times a shift capacity of one iteration of the barrel-shifting process. For example, if K=8, and 32-bit barrel-shifter 700 is used, a total of up to 256 bits of shift may be achieved.

Figure 13:
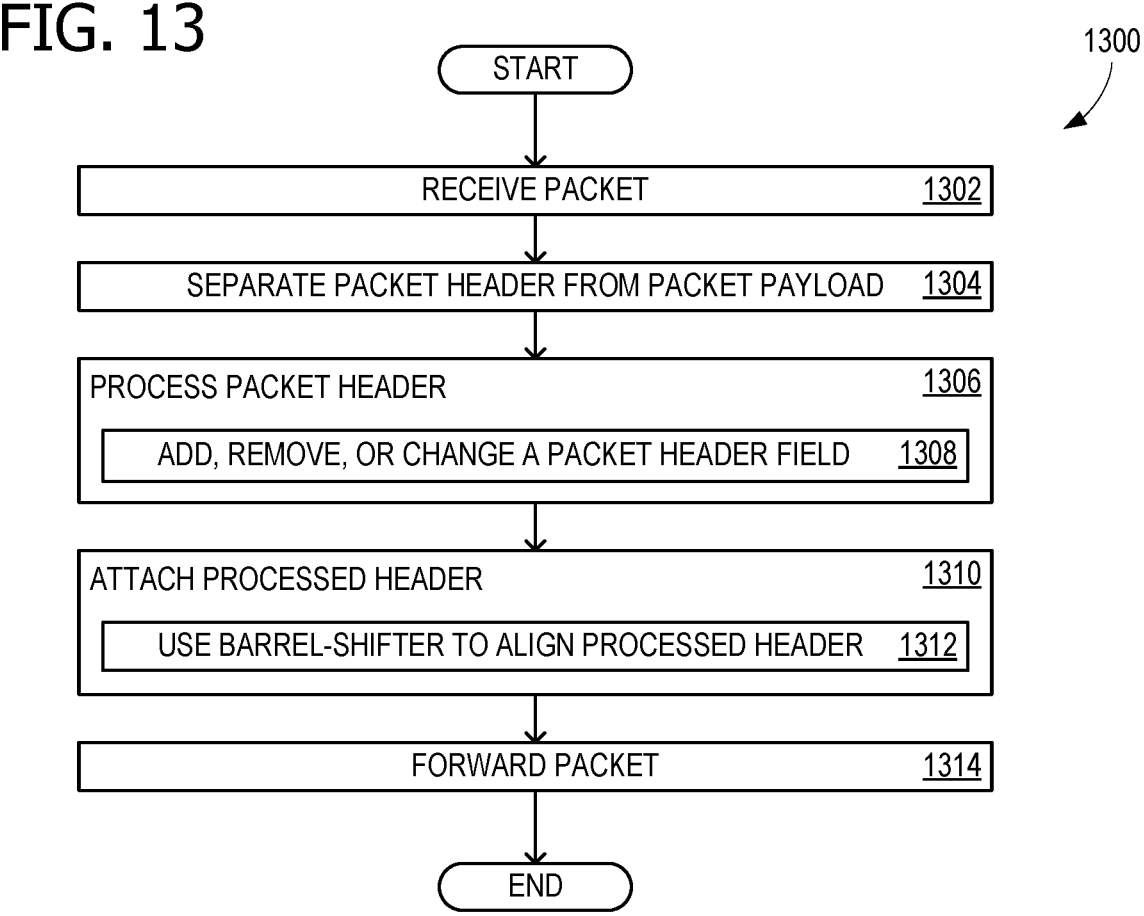

FIG. 13 shows a flowchart 1300 illustrating exemplary operations that may be performed by architecture 100. In some examples, operations described for flowchart 1300 are performed by computing device 1600 of FIG. 16. Flowchart 1300 commences with receiving packet 130 in operation 1302.

Packet header 132 is separated from packet payload 134 in operation 1304, and sent to packet header processor 136. In operation 1306, packet header processor 136 processes packet header 132 into processed packet header 138, for example by adding, deleting, or changing a packet header field in operation 1308. Operation 1310 reattaches the header, by aligning processed packet header 138 into aligned, processed packet header 140 with barrel-shifter 120 in operation 1312. It is aligned, processed packet header 140 that is attached to packet payload 134 to reconstitute packet 130. Operation 1314 forwards packet 130 to its next destination.

FIG. 14A shows a flowchart 1400 illustrating exemplary operations that may be performed by architecture 100. In some examples, operations described for flowchart 1400 are performed by computing device 1600 of FIG. 16. Flowchart 1400 is described in relation to packing scheme 1000, although it should be understood that packing scheme 900 also works with versions of flowchart 1400. Flowchart 1400 commences with converting a binary shift value (e.g., binary shift value 506) into a one-hot shift value (e.g., one-hot shift value 508) in operation 1402.

Operation 1404 concatenates value 1001, zero padding sequence 1031, and value 1002 into shifting operand 908 with value 1001 as least significant bits of shifting operand 908 and value 1002 as more significant bits. For packing scheme 900, only two values to be shifted are used, but packing scheme 1000 adds more. So, for this described example, operation 1404 also concatenates value 1003 and zero padding sequence 1032 into shifting operand 908.

Operation 1406 multiplies shifting operand 908 by one-hot shift value 1005 to produce multiplication result 909, using 18×18 multiplier 910. Operation 1408 extracts a first subset of bits from a set of least significant bits 1021 of multiplication result 909 as shifted value 1011. Operation 1410 extracts a second subset of bits from set of more significant bits 1022 of multiplication result 909 as shifted value 1012. (For packing scheme 900, operation 1410 stops after extracting value 912.) Operation 1412 extracts a third subset of bits from set of bits 1023 of multiplication result 909 as shifted value 1014. Optionally, shifted value 1014 is also extracted.

Figure 14B:
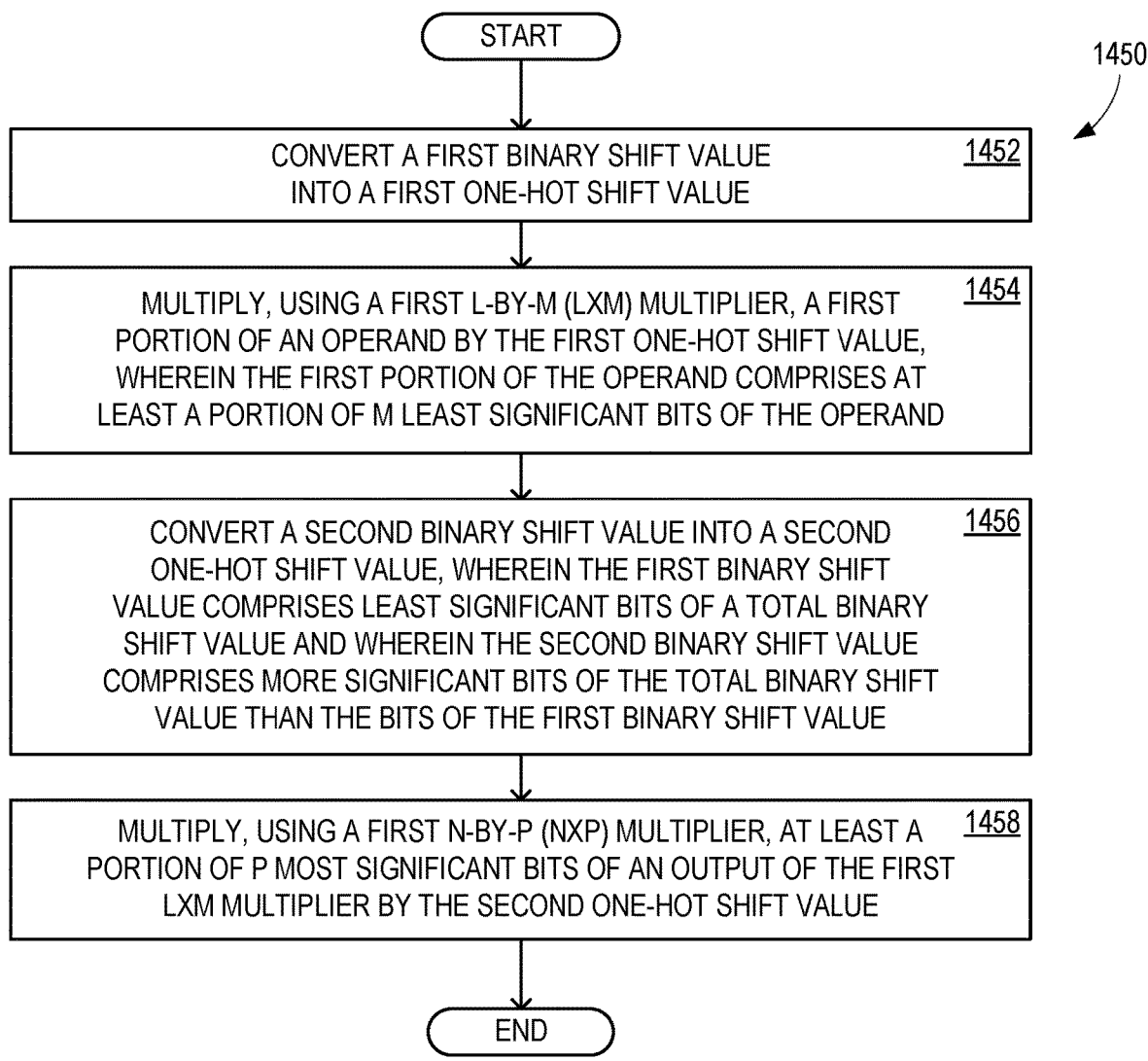

FIG. 14B shows a flowchart 1450 illustrating exemplary operations that may be performed by architecture 100. In some examples, operations described for flowchart 1450 are performed by computing device 1600 of FIG. 16. Flowchart 1450 commences with operation 1452, which includes converting a first binary shift value into a first one-hot shift value.

Operation 1454 includes multiplying, using a first L×M multiplier, a first portion of an operand by the first one-hot shift value, wherein the first portion of the operand comprises at least a portion of M least significant bits of the operand. Operation 1456 includes converting a second binary shift value into a second one-hot shift value, wherein the first binary shift value comprises least significant bits of a total binary shift value and wherein the second binary shift value comprises more significant bits of the total binary shift value than bits of the first binary shift value. Operation 1458 includes multiplying, using a first N×P multiplier, at least a portion of P most significant bits of an output of the first L×M multiplier by the second one-hot shift value.

Figure 15:
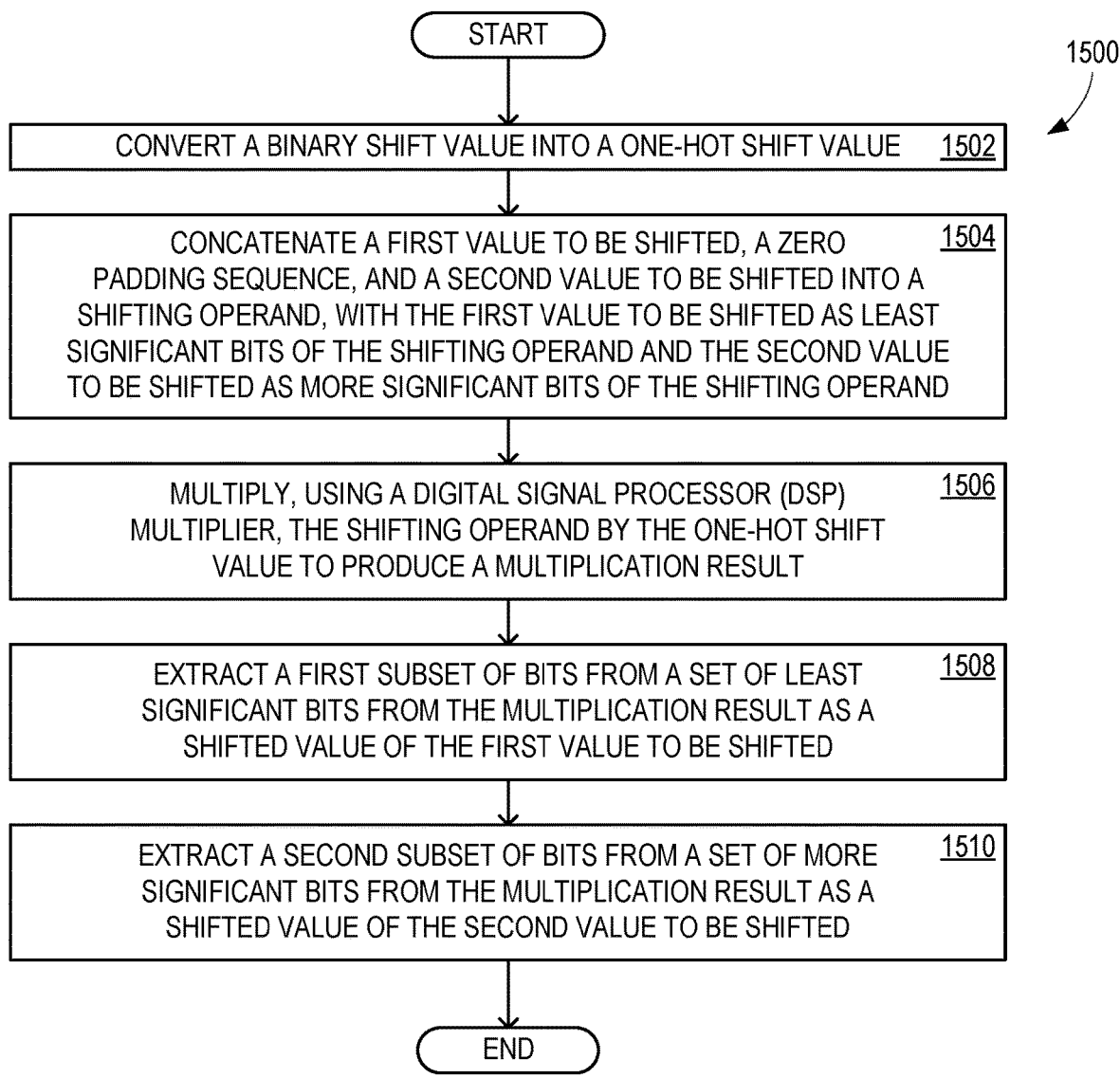

FIG. 15 shows a flowchart 1500 illustrating exemplary operations that may be performed by architecture 100. In some examples, operations described for flowchart 1500 are performed by computing device 1600 of FIG. 16. Flowchart 1500 commences with operation 1502, which includes converting a binary shift value into a one-hot shift value. Operation 1504 includes concatenating a first value to be shifted, a zero padding sequence, and a second value to be shifted into a shifting operand, with the first value to be shifted as least significant bits of the shifting operand and the second value to be shifted as more significant bits of the shifting operand.

Operation 1506 includes multiplying, using a multiplier, the shifting operand by the one-hot shift value to produce a multiplication result. Operation 1508 includes extracting a first subset of bits from a set of least significant bits of the multiplication result as a shifted value of the first value to be shifted. Operation 1510 includes extracting a second subset of bits from a set of more significant bits of the multiplication result as a shifted value of the second value to be shifted.

Additional Examples

An example system comprises a barrel-shifter, the barrel-shifter comprising: a first shift stage comprising: a first one-hot decoder operable to convert a first binary shift value into a first one-hot shift value; and a first L×M multiplier operable to multiply a first portion of an operand by the first one-hot shift value, wherein the first portion of the operand comprises at least a portion of M least significant bits of the operand; and a second shift stage comprising: a second one-hot decoder operable to convert a second binary shift value into a second one-hot shift value, wherein the first binary shift value comprises least significant bits of a total binary shift value and wherein the second binary shift value comprises more significant bits of the total binary shift value than bits of the first binary shift value; and a first N×P multiplier operable to multiply at least a portion of P most significant bits of an output of the first L×M multiplier by the second one-hot shift value.

An example computer-implemented method comprises a barrel-shifting process, the barrel-shifting process comprising: converting a first binary shift value into a first one-hot shift value; multiplying, using a first L×M multiplier, a first portion of an operand by the first one-hot shift value, wherein the first portion of the operand comprises at least a portion of M least significant bits of the operand; and converting a second binary shift value into a second one-hot shift value, wherein the first binary shift value comprises least significant bits of a total binary shift value and wherein the second binary shift value comprises more significant bits of the total binary shift value than bits of the first binary shift value; and multiplying, using a first N×P multiplier, at least a portion of P most significant bits of an output of the first L×M multiplier by the second one-hot shift value.

Another example system comprises: a bus aligner comprising: a bus-shifter comprising a barrel shifter: control logic; and a latchable register; wherein the control logic is operable to determine a total binary shift value to be performed by the bus-shifter: wherein the latchable register is operable to store an output of the bus-shifter; and wherein the barrel shifter comprises: a first shift stage comprising: a first one-hot decoder operable to convert a first binary shift value into a first one-hot shift value; and a first L×M multiplier operable to multiply a first portion of an operand by the first one-hot shift value, wherein the first portion of the operand comprises at least a portion of M least significant bits of the operand; and a second shift stage comprising: a second one-hot decoder operable to convert a second binary shift value into a second one-hot shift value, wherein the first binary shift value comprises least significant bits of the total binary shift value and wherein the second binary shift value comprises more significant bits of the total binary shift value than bits of the first binary shift value; and a first N×P multiplier operable to multiply at least a portion of P most significant bits of an output of the first L×M multiplier by the second one-hot shift value.

Another computer-implemented method comprises: converting a binary shift value into a one-hot shift value; concatenating a first value to be shifted, a zero padding sequence, and a second value to be shifted into a shifting operand, with the first value to be shifted as least significant bits of the shifting operand and the second value to be shifted as more significant bits of the shifting operand; multiplying, using a multiplier, the shifting operand by the one-hot shift value to produce a multiplication result; extracting a first subset of bits from a set of least significant bits of the multiplication result as a shifted value of the first value to be shifted; and extracting a second subset of bits from a set of more significant bits of the multiplication result as a shifted value of the second value to be shifted.

Alternatively, or in addition to the other examples described herein, examples include any combination of the following:

- the first L×M multiplier comprises a DSP multiplier of an FPGA;
- the second L×M multiplier comprises a DSP multiplier of an FPGA;
- the first N×P multiplier comprises a DSP multiplier of an FPGA;
- the second N×P multiplier comprises a DSP multiplier of an FPGA;
- the DSP multiplier is configured to perform multiple simultaneous independent multiplications;
- L is greater than or equal to N;
- M is greater than or equal to 2 times N minus 1;
- P is greater than or equal to N minus 1;
- L is 4 or 8;
- M is 7 or 15;
- N is 4 or 8;
- P is 7 or 15;
- an output of the second shift stage comprises N most significant bits of an output of the first N×P multiplier;
- the first shift stage further comprises a second L×M multiplier;
- the second L×M multiplier is operable to multiply a second portion of the operand by the first one-hot shift value;
- the second portion of the operand comprises at least a portion of M bits of the operand overlapping M/2 most significant bits of the first portion of the operand;
- the second shift stage further comprises a second N×P multiplier;

the second N×P multiplier is operable to multiply at least a portion of P most significant bits of an output of the second L×M multiplier by the second one-hot shift value;

an output of the barrel-shifter comprises a concatenation of an output of the first N×P multiplier and an output of the second N×P multiplier, with the output of the first N×P multiplier as the least significant bits of the output of the barrel-shifter;

a recursion stage is operable to recursively implement the barrel-shifter K times to produce a shift of K times a shift capacity of the barrel-shifter;

multiplying the first portion of the operand by the first one-hot shift value and multiplying the portion of the P most significant bits of the output of the first L×M multiplier by the second one-hot shift value each comprises using a DSP multiplier of an FPGA;

performing multiple simultaneous independent multiplications using the DSP multiplier;

multiplying, using a second L×M multiplier, a second portion of the operand by the first one-hot shift value;

multiplying, using a second N×P multiplier, at least a portion of P most significant bits of an output of the second L×M multiplier by the second one-hot shift value;

concatenating an output of the first N×P multiplier and an output of the second N×P multiplier, such that the output of the first N×P multiplier comprises the least significant bits of the concatenation;

recursively implementing the barrel-shifting process K times to produce a shift of K times a shift capacity of one iteration of the barrel-shifting process;

programming an FPGA to implement the barrel-shifting process;

separating a packet header from a packet payload;

processing the packet header; and attaching the processed packet header to the packet payload;

attaching the processed packet header to the packet payload comprises aligning the processed packet header with the barrel-shifter;

a packet header processor operable to processing a packet header into a processed packet header from a packet payload;

the barrel shifter is operable align the processed packet header into an aligned, processed packet header for attachment to a packet payload;

the multiplier is at least 18×18 bits wide;

the one-hot shift value is 4 bits wide;

the first value to be shifted and the second value to be shifted are each 7 bits wide, and the zero padding sequence is 3 bits wide;

concatenating a third value to be shifted and the zero padding sequence into the shifting operand;

extracting a third subset of bits from a set of bits of the multiplication result as a shifted value of the third value to be shifted;

the one-hot shift value is 2 bits wide; and the first value to be shifted, the second value to be shifted, and the third value to be shifted are each 3 bits wide, and the zero padding sequence is 1 bit wide.

While the aspects of the disclosure have been described in terms of various examples with their associated operations, a person skilled in the art would appreciate that a combination of operations from any number of different examples is also within scope of the aspects of the disclosure.

Example Operating Environment

Figure 16:
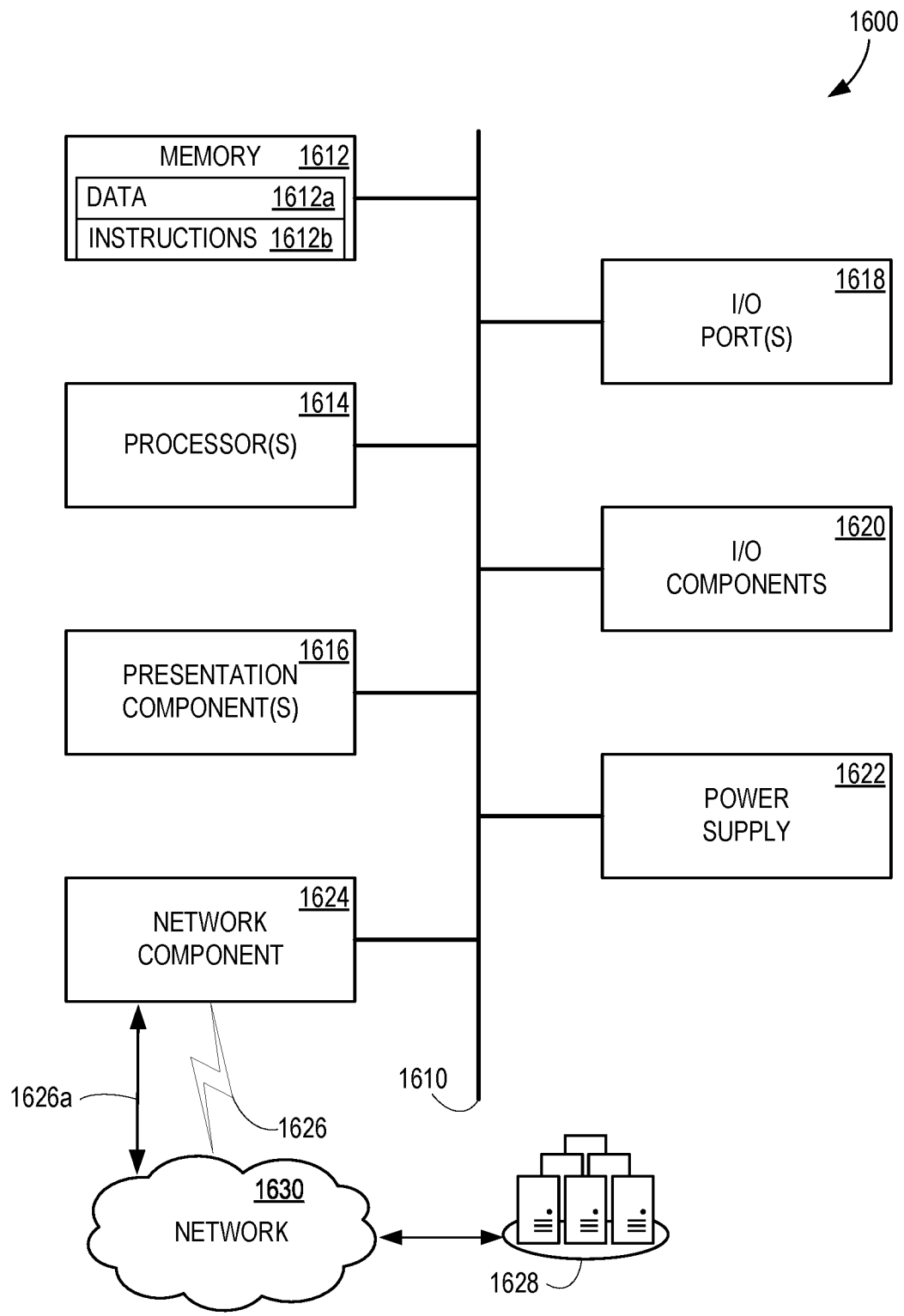
FIG. 16 shows a block diagram of an example computing device suitable for implementing some of the various examples disclosed herein.

FIG. 16 is a block diagram of an example computing device 1600 (e.g., a computer storage device) for implementing aspects disclosed herein, and is designated generally as computing device 1600. In some examples, one or more computing devices 1600 are provided for an on-premises computing solution. In some examples, one or more computing devices 1600 are provided as a cloud computing solution. In some examples, a combination of on-premises and cloud computing solutions are used. Computing device 1600 is but one example of a suitable computing environment and is not intended to suggest any limitation as to the scope of use or functionality of the examples disclosed herein, whether used singly or as part of a larger set.

Neither should computing device 1600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1600 includes a bus 1610 that directly or indirectly couples the following devices: computer storage memory 1612, one or more processors 1614, one or more presentation components 1616, input/output (I/O) ports 1618, I/O components 1620, a power supply 1622, and a network component 1624. While computing device 1600 is depicted as a seemingly single device, multiple computing devices 1600 may work together and share the depicted device resources. For example, memory 1612 may be distributed across multiple devices, and processor(s) 1614 may be housed with different devices.

Bus 1610 represents what may be one or more buses (such as an address bus, data bus, or a combination thereof). Although the various blocks of FIG. 16 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 16 and the references herein to a "computing device." Memory 1612 may take the form of the computer storage media referenced below and operatively provide storage of computer-readable instructions, data structures, program modules and other data for the computing device 1600. In some examples, memory 1612 stores one or more of an operating system, a universal application platform, or other program modules and program data. Memory 1612 is thus able to store and access data 1612a and instructions 1612b that are executable by processor 1614 and configured to carry out the various operations disclosed herein.

In some examples, memory 1612 includes computer storage media. Memory 1612 may include any quantity of memory associated with or accessible by the computing device 1600. Memory 1612 may be internal to the computing device 1600 (as shown in FIG. 16), external to the computing device 1600 (not shown), or both (not shown). Additionally, or alternatively, the memory 1612 may be distributed across multiple computing devices 1600, for example, in a virtualized environment in which instruction processing is carried out on multiple computing devices 1600. For the purposes of this disclosure, "computer storage media," "computer storage memory," "memory," and "memory devices" are synonymous terms for the memory 1612, and none of these terms include carrier waves or propagating signaling.

Processor(s) 1614 may include any quantity of processing units that read data from various entities, such as memory 1612 or I/O components 1620. Specifically, processor(s) 1614 are programmed to execute computer-executable instructions for implementing aspects of the disclosure. The instructions may be performed by the processor, by multiple processors within the computing device 1600, or by a processor external to the client computing device 1600. In some examples, the processor(s) 1614 are programmed to execute instructions such as those illustrated in the flow charts discussed below and depicted in the accompanying drawings. Moreover, in some examples, the processor(s) 1614 represents an implementation of analog techniques to perform the operations described herein. For example, the operations may be performed by an analog client computing device 1600 and/or a digital client computing device 1600. Presentation component(s) 1616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1600, across a wired connection, or in other ways. I/O ports 1618 allow computing device 1600 to be logically coupled to other devices including I/O components 1620, some of which may be built in. Example I/O components 1620 include, for example but without limitation, a microphone, joystick, game pad, satellite dish, scanner, printer, wireless device, etc.

Computing device 1600 may operate in a networked environment via the network component 1624 using logical connections to one or more remote computers. In some examples, the network component 1624 includes a network interface card and/or computer-executable instructions (e.g., a driver) for operating the network interface card. Communication between the computing device 1600 and other devices may occur using any protocol or mechanism over any wired or wireless connection. In some examples, network component 1624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1624 communicates over wireless communication link 1626 and/or a wired communication link 1626a to a remote resource 1628 (e.g., a cloud resource) across network 1630. Various different examples of communication links 1626 and 1626a include a wireless connection, a wired connection, and/or a dedicated link, and in some examples, at least a portion is routed through the internet.

Although described in connection with an example computing device 1600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising." "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    a barrel-shifter operable to align a processed packet header into an aligned, processed packet header for attachment to a packet payload, the barrel-shifter comprising:
        a first shift stage comprising:
            a first one-hot decoder operable to convert a first binary shift value into a first one-hot shift value; and
            a first L-by-M (L×M) multiplier operable to multiply a first portion of an operand by the first one-hot shift value, wherein the first portion of the operand comprises at least a portion of M least significant bits of the operand; and
        a second shift stage comprising:
            a second one-hot decoder operable to convert a second binary shift value into a second one-hot shift value, wherein the first binary shift value comprises least significant bits of a total binary shift value and wherein the second shift value comprises more significant bits of the total binary shift value than bits of the first binary shift value; and
            a first N-by-P (N×P) multiplier operable to multiply at least a portion of P most significant bits of an output of the first L×M multiplier by the second one-hot shift value.

2. The system of claim 1, further comprising:
    a packet header processor operable to processing a packet header into the processed packet header from the packet payload.

3. The system of claim 2, wherein the first L×M multiplier and the first N×P multiplier comprises a digital signal processor (DSP) multiplier of a field programmable gate array (FPGA).

4. The system of claim 3, wherein the DSP multiplier is configured to perform multiple simultaneous independent multiplications.

5. The system of claim 1, wherein L is greater than or equal to N.

6. The system of claim 1, wherein M is greater than or equal to 2 times N minus 1, and wherein P is greater than or equal to N minus 1.

7. The system of claim 1, wherein an output of the second shift stage comprises N most significant bits of an output of the first N×P multiplier.

8. The system of claim 1, wherein the first shift stage further comprises: a second L×M multiplier operable to multiply a second portion of the operand by the first one-hot shift value, wherein the second portion of the operand comprises at least a portion of M bits of the operand overlapping M/2 most significant bits of the first portion of the operand; and wherein the second shift stage further comprises: a second N×P multiplier operable to multiply at least a portion of P most significant bits of an output of the second L×M multiplier by the second one-hot shift value; and
    wherein an output of the barrel-shifter comprises a concatenation of an output of the first N×P multiplier and an output of the second N×P multiplier, with the output of the first N×P multiplier as the least significant bits of the output of the barrel-shifter.

9. The system of claim 1, further comprising:
    a recursion stage operable to recursively implement the barrel-shifter K times to produce a shift of K times a shift capacity of the barrel-shifter.

10. A computer-implemented method comprising a barrel-shifting process, the barrel-shifting process performed by a barrel-shifter operable to align a processed packet header into an aligned, processed packet header for attachment to a packet payload, the method comprising:
    converting, by the barrel-shifter, a first binary shift value into a first one-hot shift value;
    multiplying, by the barrel-shifter using a first L-by-M (L×M) multiplier, a first portion of an operand by the first one-hot shift value, wherein the first portion of the operand comprises at least a portion of M least significant bits of the operand;
    converting, by the barrel-shifter, a second binary shift value into a second one-hot shift value, wherein the first binary shift value comprises least significant bits of a total binary shift value and wherein the second binary shift value comprises more significant bits of the total binary shift value than bits of the first binary shift value; and
    multiplying, by the barrel-shifter using a first N-by-P (N×P) multiplier, at least a portion of P most significant bits of an output of the first L×M multiplier by the second one-hot shift value.

11. The computer-implemented method of claim 10, further comprising:
    separating a packet header from the packet payload;
    processing the packet header; and
    attaching the processed packet header to the packet payload.

12. The computer-implemented method of claim 11, wherein attaching the processed packet header to the packet payload comprises aligning the processed packet header with the barrel-shifter.

13. The computer-implemented method of claim 10, wherein multiplying the first portion of the operand by the first one-hot shift value and multiplying the portion of the P most significant bits of the output of the first L×M multiplier by the second one-hot shift value each comprises using a digital signal processor (DSP) multiplier of a field programmable gate array (FPGA), and wherein the method further comprises:
performing multiple simultaneous independent multiplications using the DSP multiplier.

14. The computer-implemented method of claim 10, wherein L is greater than or equal to N, wherein M is greater than or equal to 2 times N minus 1, and wherein P is greater than or equal to N minus 1.

15. The computer-implemented method of claim 10, further comprising:
multiplying, using a second L×M multiplier, a second portion of the operand by the first one-hot shift value, wherein the second portion of the operand comprises at least a portion of M bits of the operand overlapping M/2 most significant bits of the first portion of the operand; and
multiplying, using a second N×P multiplier, at least a portion of P most significant bits of an output of the second L×M multiplier by the second one-hot shift value; and
concatenating an output of the first N×P multiplier and an output of the second N×P multiplier, such that the output of the first NXP multiplier comprises least significant bits of the concatenation.

16. The computer-implemented method of claim 10, further comprising:
recursively implementing the barrel-shifting process K times to produce a shift of K times a shift capacity of one iteration of the barrel-shifting process.

17. The computer-implemented method of claim 10, further comprising:
programming a field programmable gate array (FPGA) to implement the barrel-shifting process.

18. A system comprising:
a bus aligner comprising:
a bus-shifter comprising a barrel shifter operable to align a processed packet header into an aligned, processed packet header for attachment to a packet payload;
control logic; and
a latchable register;
wherein the control logic is operable to determine a total binary shift value to be performed by the bus-shifter;
wherein the latchable register is operable to store an output of the bus-shifter; and
wherein the barrel shifter comprises:
a first shift stage comprising:
a first one-hot decoder operable to convert a first binary shift value into a first one-hot shift value; and
a first L-by-M (L×M) multiplier operable to multiply a first portion of an operand by the first one-hot shift value, wherein the first portion of the operand comprises at least a portion of M least significant bits of the operand; and
a second shift stage comprising:
a second one-hot decoder operable to convert a second binary shift value into a second one-hot shift value, wherein the first binary shift value comprises least significant bits of the total binary shift value and wherein the second binary shift value comprises more significant bits of the total binary shift value than bits of the first binary shift value; and
a first N-by-P (N×P) multiplier operable to multiply at least a portion of P most significant bits of an output of the first L×M multiplier by the second one-hot shift value.

19. The system of claim 18, further comprising:
a packet header processor operable to process a packet header into the processed packet header from the packet payload.

20. The system of claim 18, wherein the first L×M multiplier and the first N×P multiplier comprises a digital signal processor (DSP) multiplier of a field programmable gate array (FPGA), wherein the DSP multiplier is configured to perform multiple simultaneous independent multiplications.

21. The system of claim 20, wherein the first shift stage further comprises:
a second L×M multiplier operable to multiply a second portion of the operand by the first one-hot shift value, wherein the second portion of the operand comprises at least a portion of M bits of the operand overlapping M/2 most significant bits of the first portion of the operand.

22. The system of claim 21,
wherein the second shift stage further comprises:
a second N×P multiplier operable to multiply at least a portion of P most significant bits of an output of the second L×M multiplier by the second one-hot shift value; and
wherein an output of the barrel-shifter comprises a concatenation of an output of the first N×P multiplier and an output of the second N×P multiplier, with the output of the first N×P multiplier as least significant bits of the output of the barrel-shifter.

* * * * *